(12) United States Patent
Pellenc

(10) Patent No.: US 9,363,946 B2
(45) Date of Patent: Jun. 14, 2016

(54) MULTIFUNCTIONAL ROTARY CUTTING HEAD FOR CUTTING DEVICES, AND PORTABLE DEVICES COMPRISING SUCH A CUTTING HEAD

(75) Inventor: Roger Pellenc, Pertuis (FR)

(73) Assignee: PELLENC (SOCIETE ANONYME), Pertuis (FR)

( * ) Notice: Subject to any disclaimer, the term of this patent is extended or adjusted under 35 U.S.C. 154(b) by 666 days.

(21) Appl. No.: 13/639,964

(22) PCT Filed: Apr. 18, 2011

(86) PCT No.: PCT/FR2011/000233
§ 371 (c)(1),
(2), (4) Date: Nov. 23, 2012

(87) PCT Pub. No.: WO2011/131860
PCT Pub. Date: Oct. 27, 2011

(65) Prior Publication Data
US 2013/0205596 A1  Aug. 15, 2013

(30) Foreign Application Priority Data

Apr. 21, 2010 (FR) ...................................... 10 01689

(51) Int. Cl.
| | |
|---|---|
| *B26B 7/00* | (2006.01) |
| *A01D 34/412* | (2006.01) |
| *A01D 34/73* | (2006.01) |
| *A01D 34/416* | (2006.01) |

(52) U.S. Cl.
CPC ............ *A01D 34/412* (2013.01); *A01D 34/416* (2013.01); *A01D 34/733* (2013.01); *A01D 34/4166* (2013.01)

(58) Field of Classification Search
CPC   A01D 34/412; A01D 34/4166; A01D 34/733
USPC ....................................... 30/347, 276; 56/12.7
See application file for complete search history.

(56) References Cited

U.S. PATENT DOCUMENTS

| | | | |
|---|---|---|---|
| 4,790,071 A | 12/1988 | Helmig et al. | |
| 5,862,598 A * | 1/1999 | Lee | ................................. 30/276 |
| 6,298,642 B1 | 10/2001 | Harb | |
| 8,291,599 B2 * | 10/2012 | Piccolo | ........................... 30/276 |
| 8,307,559 B2 * | 11/2012 | Tomita | ............................ 30/276 |

FOREIGN PATENT DOCUMENTS

FR           2712136 A1    5/1995

* cited by examiner

*Primary Examiner* — Omar Flores Sanchez
(74) *Attorney, Agent, or Firm* — Egbert Law Offices, PLLC

(57) ABSTRACT

A multifunctional rotary cutting head is provided for cutting devices as well as portable devices equipped with such a cutting head. The cutting head comprises a rotary housing that has at least a top part and a bottom part and accommodates a support for one or more cutting elements or tools. The support is penetrated by an axial drive shaft on which the support is mounted. The support for the cutting element(s) or tool(s) has two leads to selectively mounting the cutting element(s) or tool(s), i.e. a first level designed to mount strands of cutting wire and a second level designed to mount an interchangeable cutting blade.

24 Claims, 21 Drawing Sheets

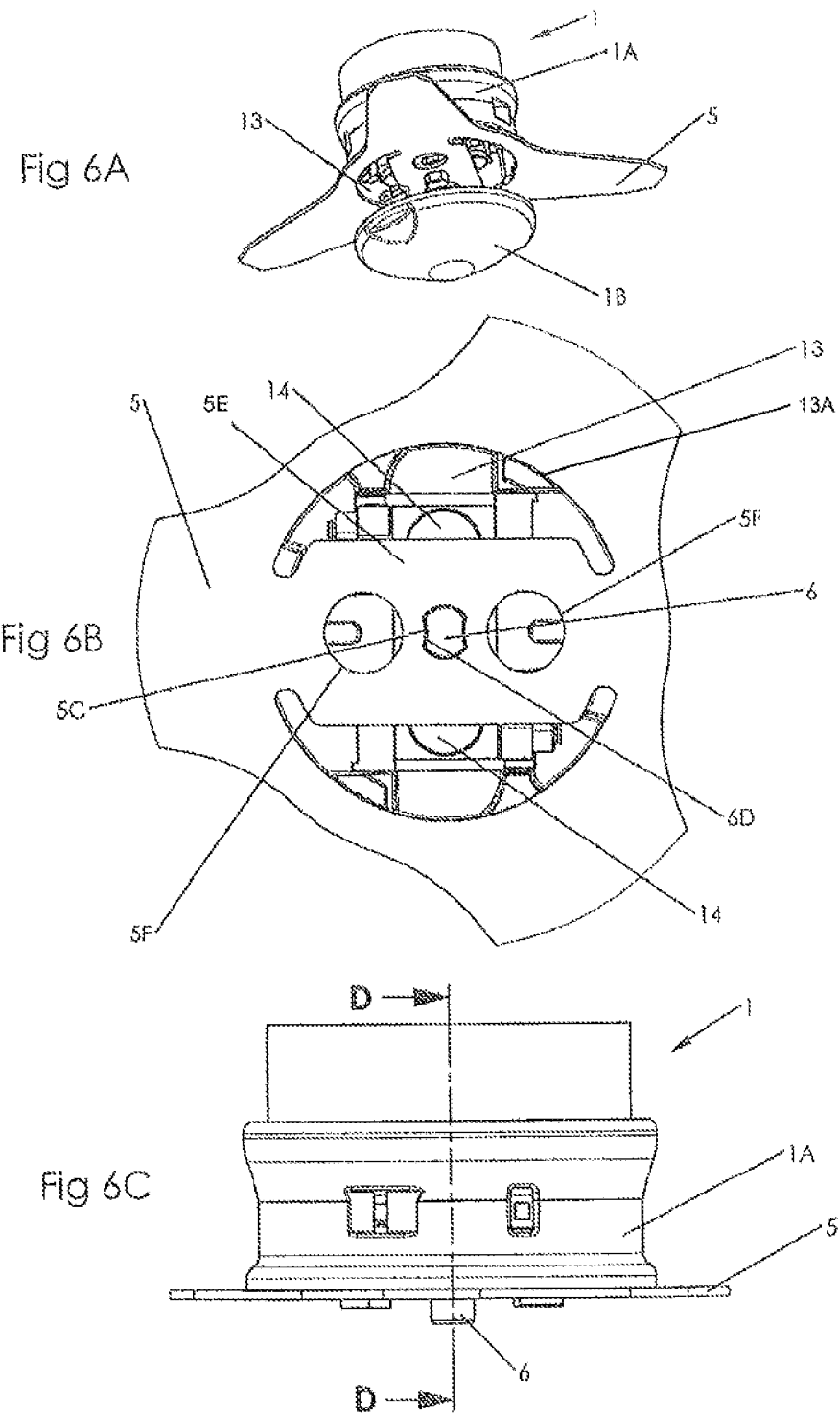

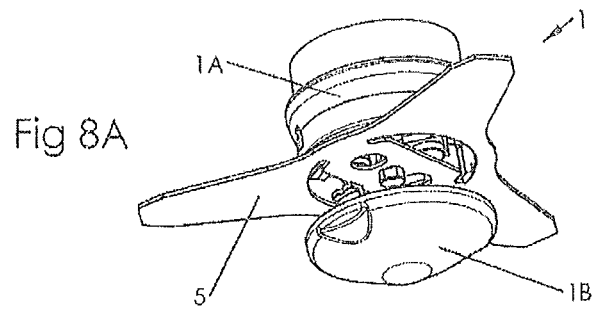
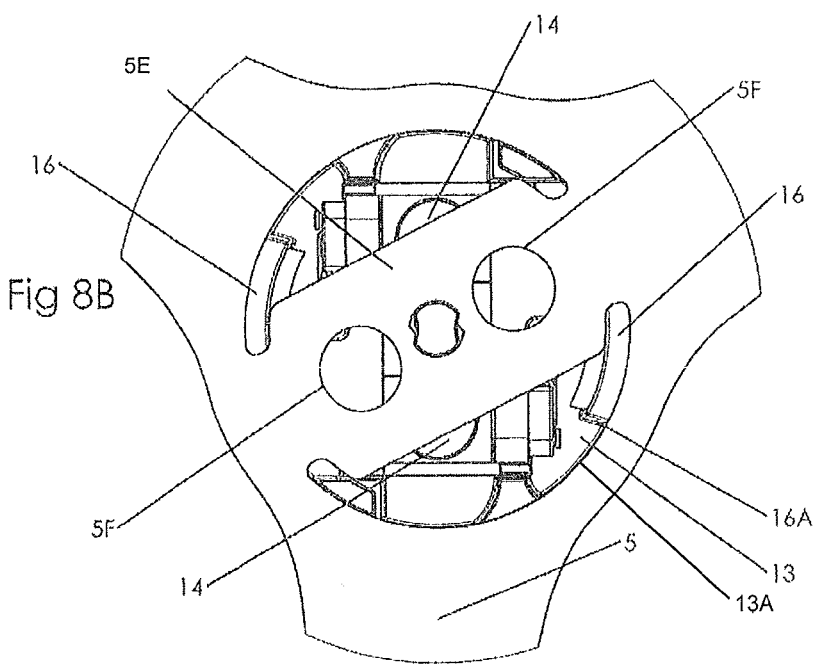
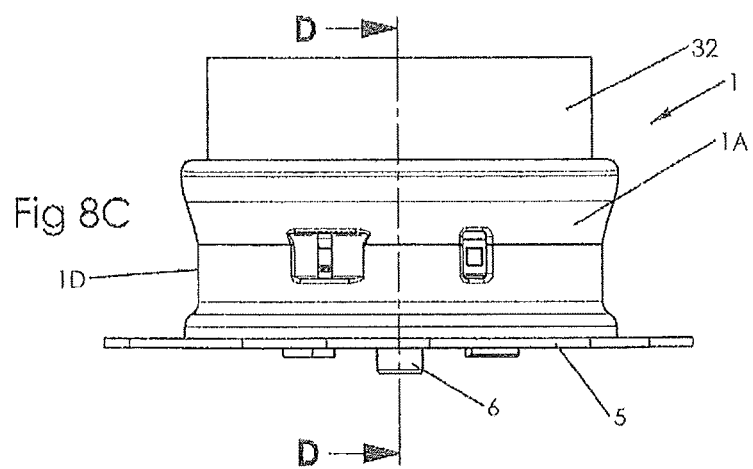

MULTIFUNCTIONAL ROTARY CUTTING HEAD FOR CUTTING DEVICES, AND PORTABLE DEVICES COMPRISING SUCH A CUTTING HEAD

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN SUBMITTED ON COMPACT DISC

Not applicable.

BACKGROUND OF THE. INVENTION

1. Field of the Invention

The present invention concerns a multifunctional rotary cutting head. It is more specifically intended for equipping portable cutting tools such as edge-trimmers, also called grass cutters or grass trimmers, brush cutters, motorized grass mowers, grass-trimmers or the like.

2. Description of Related Art Including Information Disclosed Under 37 CFR 1.97 and 37 CFR 1.98

Generally, it is customary to classify under the name of edge-cutter or grass-cutter all devices whose function it is to cut lawns or grasses with low resistance. The cutting heads used for this purpose are generally of the type where the cutting elements are constituted by lengths of flexible wires of plastic material, for example of 'Nylon' yarn. On the other hand, the devices that are used for cutting vegetation already lignified (small brush, tree or shrub shoots, tall grasses, hedges, . . . ) are more often called brush-cutters, hedge-trimmers, and their cutting head uses rotary metallic or hard plastic blades. By the way of examples documents US-2001/0023542, U.S. Pat. No. 6,401,344, U.S. Pat. No. 6,944,956, WO-2004/064489, WO-2005/032237, WO-2006/017372, WO-2008/139246, FR-2888085 are cited which describe various possible layouts of cutting heads using cutting elements constituted by lengths of flexible cutting wires. Examples of cutting heads using metallic cutting wires are for instance described in document WO-2007/099443.

These cutting heads are mounted at the distal end of a handle equipped with a U-shaped grip or a dual guide and control handle for the motor ensuring the rotational drive of said cutting heads, as well as with a ring for fastening a carrying harness.

The portable cutting devices currently available on the market are either designed for use of only one type of cutting tool, or, for the sake of being multifunctional, certain machines provide for each of these types of elements a specific interchangeable head: one for wire, one for a metal blade, etc.

If one wants to go from one type to the other, it is necessary to remove all or a portion of the support of the one to replace it by all or part of the support of the other. These two types of support require a removal and the use of one or several tools. This situation has additional disadvantages:

The need for training the user in the removal (often left-hand thread)/disassembly and re-assembly of the cutting tool supports, requiring the use of cutting tools one always has to keep within reach.

Loss of time and risk of injury; loss of parts during removal and re-assembly.

It happens frequently that because of the location of the surfaces on which shearing or brush clearing needs to be performed, the users need to acquire one wire device for cutting soft grasses (for example, surfaces around trees or near hard obstacles such as edges of walls, terraces or bodies of masonry, etc.) and a blade device for the clearing of brush in high and bard grasses, or in ligneous plantings (brambles, ferns, . . . ) or in brush, or for the cutting of hedges or the thinning out of shrubby trees. It is clear that such a situation results in increased expenses for acquisition and initiation of the cutting materials.

To remedy the disadvantages of the devices of the aforementioned kind which are meant for specific cutting jobs, in document WO-2007/099443, a tool iota shrub slasher with dual action has been proposed for combined cutting of grass and brush this tool consisting of a rectangular blade with a center hole for connection to a rotary head of a landscape brush rake and of suitable materials which are provided with a pair of cylindrical through-holes for the insertion of small lengths of Nylon or another durable plastic material. This tool allows simultaneous cutting of grass and brush, while avoiding the operations of attaching and detaching the blade, while also achieving efficient disintegration of the grass and brush.

This tool is not versatile in so far as, even if it allows simultaneous cutting of grass and small woody plants in order to proceed with the fragmentation of the cut materials, it is not suitable for mounting on an edge-trimmer or grass cutter that has to be used in proximity to bard obstacles.

BRIEF SUMMARY OF THE INVENTION

One aim of the invention is to remedy the previously noted disadvantages of portable cutting devices of the edge-trimming or brush-slashing kind.

According to the described example, the cutting head according to the invention is in particular remarkable in that it comprises a rotating housing constituted by at least two parts, namely an upper part and a tower part attached to the base of said upper part, and in which is housed, with an aptitude of axial translation of limited amplitude, a support of cutting element(s) or tool(s) through which passes an axial drive shaft integral in rotation of said support and the upper part of which is fitted to permit its coupling to the motor of a portable cutting device, said support of cutting element(s) or tool(s) being mounted with a possibility of axial movement of limited amplitude on said axial drive shaft, said support of cutting element(s) or tool(s) being provided with two levels for the selective mounting of the latter, namely:

a first level fitted for the mounting of pieces of cutting wire, and, a second level fitted for the mounting of an interchangeable cutting blade.

According to a preferred method of production, said support of cutting element(s) or tool(s) is provided with two levels for the selective mounting of the latter, namely:

a first upper level fitted for the mounting of pieces of cutting wire, and, a second lower level fitted for the mounting of an interchangeable cutting blade.

The cutting head comprises means for blocking or disconnecting of the selected cutting element(s) shaped so that the simultaneous application of relative axial movements in opposite direction to said exterior housing and to said support of cutting element(s) or tool(s) results in:—either the placement of the level corresponding to the selected type of cutting element(s) in a position allowing the positioning or the withdrawal of said element;—or the blocking of the latter on the level of said support corresponding to the chosen type of cutting element.

According to a preferred and advantageous method of production, the exterior housing and the support of elements or cutting tool are fitted so that the simultaneous application of axial movement(s) convergent to said housing and to said support located inside the latter is used to allow the placement of the level corresponding to the selected type of cutting element in a position allowing the positioning or withdrawal of said cutting tool(s), whereas the simultaneous application of axial movements divergent to said housing and said support allows the automatic blocking of said cutting elements on the level of the support corresponding to the selected type of cutting elements.

According to another characteristic disposition, the convergent relative axial movements of the exterior housing and of support of cutting element(s) or tool(s) are obtained automatically under the action of an elastic return device, so as to allow automatic blockage of the cutting elements after their positioning in the cutting head.

According to a preferred method of production, the elastic return device consists of a spring acting in compression and interposed between an interior partitioning of the exterior housing and the interior support of cutting element(s) or tool(s).

According to another characteristic disposition, the upper level of the support of cutting element(s) or tool(s) includes a fastening mechanism of the cutting wires engaged inside the exterior housing of the cutting head, through orifices made in the side wall of the housing, integral in rotation of said support of the fastening mechanism, features clamping cams mounted with an aptitude for swiveling in the parallel planes between them and to the axis of rotation of the cutting head, this support of cutting elements or tools is mounted with an aptitude of axial translation of limited amplitude in the exterior housing of the cutting head, the latter and the fastening mechanism being fitted in a complementary fashion, so that the simultaneous application of axial movements convergent to said housing and to said support is used to allow raising the clamping cams so as to permit the introduction, the sliding or the positioning of the cutting wires inside the cutting head, whereas the simultaneous application of axial movements divergent to said housing and said support permits lowering said cams in order to achieve the blockage in active position of the cutting wires in the cutting head.

According to another characteristic disposition, the fastening mechanism comprises two guiding and positioning channels of the lengths of cutting wire, located in parallel on both sides of the rotational axis of the cutting head facing the openings of the exterior housing, an entrance portion of each of these channels is uncovered and a pivoting cam is raised opposite this uncovered portion, this cam being subject to the action of a spring tending to apply its clamping surface in the direction of said uncovered portion, so as to strongly press the cutting wire engaged in the positioning channel against the bottom of the latter, thereby ensuring the blockage of said cutting wire, the housing is equipped on the inside with thrust fingers integral with an tipper partitioning of said housing and allowing to push back and pivot the cam in order to remove the pressure of the cam from the cutting wire when the exterior housing and the support of the fastening mechanism are subjected to forces of convergent pressure tending to bring closer together the upper partitioning of said exterior housing and the upper face of the support of the fastening mechanism.

According to another characteristic disposition, the cutting blade is inserted in a removable manner between the upper and lower parts of the housing. According to the interesting embodiment shown:

the lower level of the support of cutting elements or tools is constituted by a blade support, this blade support and the cutting blade being provided with complementary means of positioning and coupling in rotation of the latter, these means can be disengaged from their active position by simultaneous manual application, on said housing and said blade support, of convergent relative axial movements;

complementary means ensure the axial blockage of the cutting blade on the distal portion of the drive shaft;

a coupling device provides an automatic rotational connection of the blade support and of the blade when a blade is positioned on said blade support.

According to another characteristic disposition, the central part of the blade features:

on the one hand, a central opening for the passage of the drive shaft, two coupling orifices placed on both ends of said central shaft, two openings presenting a curved exterior side; and on the other hand, solid parts which allow the driving in of the blade on the distal part of the rotation shaft, up to its locking position.

According to an another advantageous embodiment, the blade support and the central part of the blade are fitted so as to permit the installation of said blade on said blade support by a convergent relative axial movement of these, followed by a rotational movement of the blade; the removal of the blade is done by reverse movements.

According to another embodiment, the means of positioning and coupling of the cutting blade to the blade support include, on the one hand, two coupling studs placed on the underside of said blade support, on both sides of the axial opening made in the latter, and, on the other hand, two orifices made on either side of the axial opening of the blade in which the distal portion of the drive shaft is engaged.

According to another preferred embodiment, the rotation coupling of the lower blade support and the exterior housing is made by drive pins integral with the inside face of an upper partition of the housing and oriented parallel to the rotational axis of the cutting head, towards the inside of the latter, these drive pins being engaged with an aptitude of sliding in grooves made in the blade support.

According to another embodiment, the coupling grooves are made in at least opposite sides of the blade support.

According to another characteristic disposition, the drive shaft traverses an axial passage made in the blade support, and the traversing portion of the shaft and said axial passage present a complementary profile suitable for the rotational drive of said support.

According to a preferred method of production, said cutting head features means to limit the amplitude of the axial translation of the blade support on the traversing portion of the drive shaft.

According to another characteristic disposition, the cutting head includes restraint fixtures of the blade support on the drive shaft.

According to a preferred embodiment, the axial restraining fixtures of the cutting blade on the drive shaft comprise, on the one hand, an axial opening on the cutting blade, and, on the other hand, a ring-shaped groove featured on the distal portion of the drive shaft, at the distance of its end, the end portion of said drive shaft presenting, from said groove on, a circular shape with two longitudinal, diametrically opposed female grooves, whereas the axial opening of the cutting blade presents a male shape identical to that of the profile of said end portion.

According to another characteristic disposition, the lower edge of the upper part of the housing and the cutting blade are provided with complementary means of positioning.

According to a preferred embodiment, the complementary means of positioning of the housing and of the cutting blade include, on the one hand, two openings delineated by an external arched edge and located on either side and at equal distance of the diametrical alignment of openings on the blade, and, on the other hand, diametrically opposed guide and stop cleats on the base of said upper part; at least one of the ends of said openings extends itself by a notch.

According to another characteristic disposition, the lower part of the side wall of the housing and the circular upper part of the sliding bowl are provided with complementary retaining fixtures the assembly of which requires only a relative axial movement of the two parts, followed by a rotational movement of limited amplitude, enabling the engagement of the complementary elements of said retaining fixtures.

According to another characteristic disposition, the retaining fixtures of the housing and the bowl include, on the one hand, in the vicinity of and along the circular lower edge of the inside surface of the cylindrical sidewall of the housing, at least two diametrically opposed rounded shoulders, and, on the other hand, at least two diametrically opposed lock stops extending parallel to the axis of the sliding bowl and the free end of which is provided with a locking peg or lug oriented in direction of this axis.

Preferably, the cutting head comprises a stop located at one of the ends of each shoulder, limiting the rotational movement of the locking pegs or lugs during the placement of the sliding bowl in the engagement position.

According to an advantageous disposition, the edge of the pea and the rounded shoulder of the pegs are provided with complementary locking means at the end of the rotational movement when the housing parts are engaged.

According to a preferred embodiment, the complementary locking means of the lower part on the upper part of the housing are constituted by a stud on the upper face of the shoulders and by a notch provided in the outside edge of the peg in which said locking stud engages automatically at the end of the rotational movement of engagement.

The portable cutting device according to the invention, such as grass-cutter, or edge cutter, or shrub slasher, or motorized lawn mower, or hedge trimmer . . . is remarkable and advantageous in that it is equipped with a rotary cutting head using flexible lengths of cutting wire or cutting blades featuring the aforementioned characteristics, depending on the work to be performed.

BRIEF DESCRIPTION OF THE DRAWINGS

The above aims, characteristics and advantages and still others will become more evident in the following detailed description and attached drawings in which:

FIG. 3Ab is a front view of the cutting head provided with a cutting blade, in locked position.

FIG. 3Bb is a cross-section along line Eb-Eb of FIG. 3Ab.

FIG. 3Cb is a cross-section along line Lb-Lb of FIG. 3Bb.

FIG. 3Db is a cross-section along line Kb-Kb of FIG. 3Bb.

FIGS. 3Aa to 3E illustrate a phase of positioning of the lengths of cutting wire in the housing, according to which the fastening mechanism constituting the upper level of the mobile support of cutting element or tool is displaced in the high position, allowing the retraction of the clamping cams and the insertion of the wires into said mechanism.

FIG. 6A is a perspective view analog to FIG. 3A showing the second phase of positioning of the metal blade.

FIG. 6B is a bottom view of FIG. 6A without the sliding bowl.

FIG. 6C is an exterior view of FIG. 6A without the sliding bowl.

FIG. 8A is a perspective view showing the third phase of the positioning of the metal blade.

FIG. 8B is a bottom view of FIG. 8A, the sliding bowl being removed.

FIG. 8C is an exterior view of FIG. 8A without the sliding bowl.

Reference is made to these drawings to describe interesting, although by no means limiting, examples of production of the multifunctional cutting head according to the invention.

DETAILED DESCRIPTION OF THE INVENTION

In the following disclosure and the claims, in order to facilitate the description of the invention, words such as high. "low", "upper", "lower", "lateral", "upper level", "lower level" ... are used in reference to a position of the cutting head in operation, when the axis of said cutting head is oriented vertically. Hence, these words and terms do not have any restrictive character.

Figure 1A:
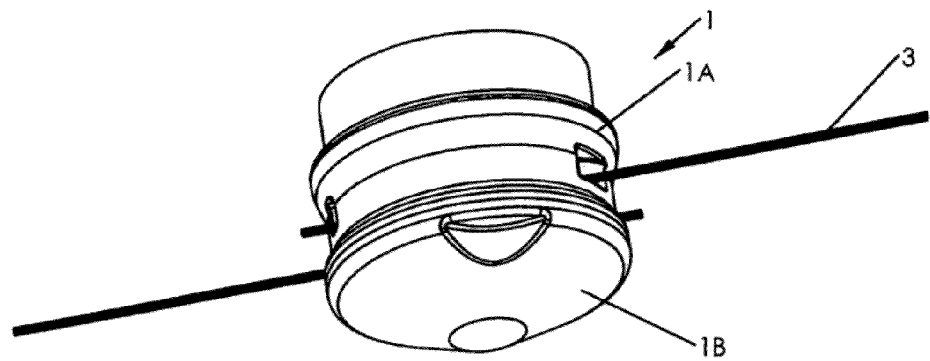
FIG. 1A is a perspective view of a cutting head according to the invention, provided with lengths of flexible cutting wires and which can be equipped with a cutting blade.
Figure 1B:
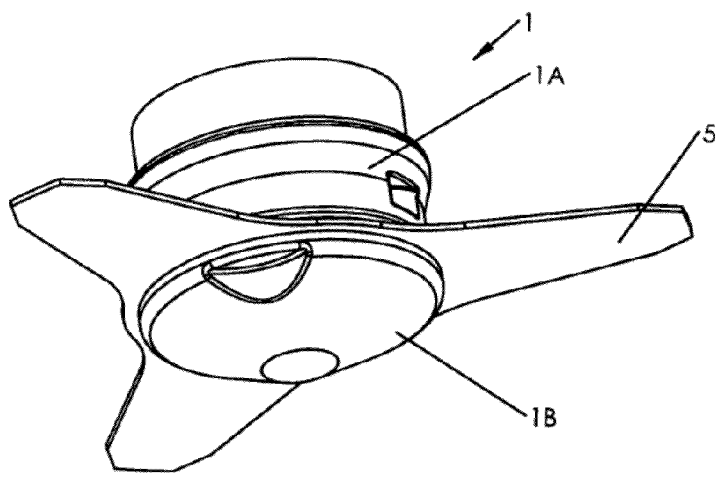
FIG. 1B is a perspective view of a cutting head according to the invention, provided with a cutting blade and which can be equipped with lengths of flexible cutting wires.
Figure 2:
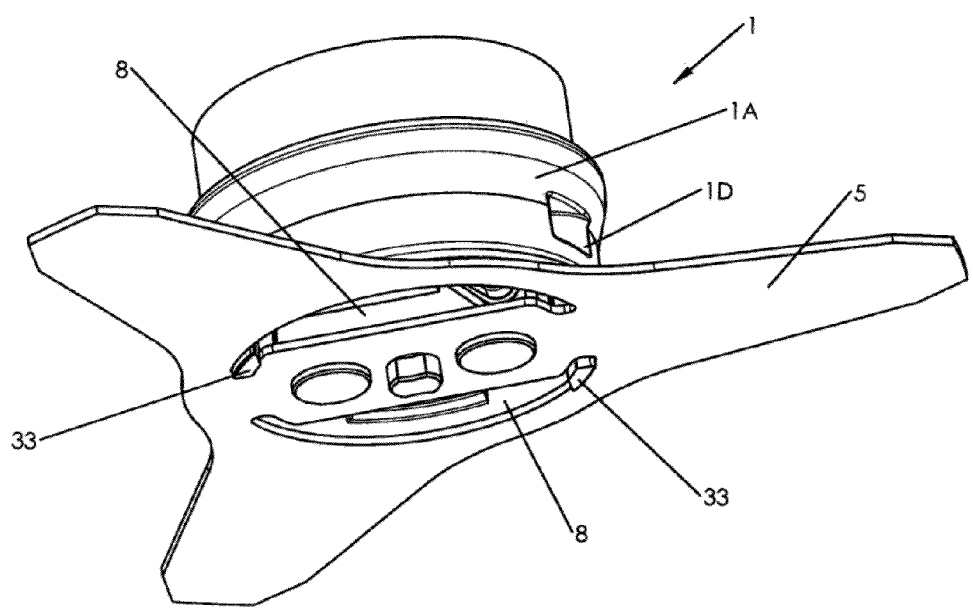
FIG. 2 is a perspective view of a cutting head provided with an interchangeable cutting blade, according to the invention, with the sliding bowl removed.

The cutting head 1 comprises a rotating housing constituted by at least two parts 1A and 1B, or an upper part 1A and a lower part 1B assembled at the base of said upper part, and in which is housed, with an aptitude of axial translation of limited amplitude, a support 2 of cutting element(s) (FIGS. 1A and 1B) or tool(s) 3,5, traversed by an axial drive shaft 6 integral in rotation of said support 2 and whose upper part is fitted so as to permit its coupling to the motor of a portable cutting device, said support of cutting element(s) or tool(s) being mounted with a capability of axial movement of limited amplitude on said axial drive shaft 6, said support of cutting element(s) or tool(s) being provided with two levels for the selective mounting of the latter, namely:

a first upper level fitted for the mounting of lengths of cutting wire 3 (FIG. Aa to 3F), and a second lower level fitted for the removable mounting of an interchangeable cutting blade 5 (FIG. 4A to 10C).

The cutting head comprises blocking or disconnecting means of the selected cutting element(s) 3 or 5 shaped so that the simultaneous application of a relative axial movement in the opposite direction to the exterior housing 1A and to said support of cutting elements or tool 2, results in:

either the placement of the level corresponding to the cutting element 3 or 5 in a position enabling the positioning or the retraction of said element, or the blockage of the latter on the level of said support corresponding to the type of cutting elements selected.

According to this example of production, the exterior housing 1A and the support 2 of cutting elements or tools are fitted so that the simultaneous application of axial movements convergent to said housing and to said support located inside the latter, is used to allow the placement of the level corresponding to the selected cutting element 3, 5, in a position allowing the positioning or retraction of said cutting element, whereas the simultaneous application of axial movements divergent from said housing and said support allows automatic blockage on the level of the support corresponding to the selected type of cutting element.

The convergent relative axial movements of the exterior housing 1A and of the support 2 of cutting element(s) or tool(s) 3, 5, are obtained automatically by the action of an elastic return device 7, so as to permit automatic blockage of the cutting elements or tools after their positioning in the cutting head.

The elastic return device is constituted by a spring 7 acting under compression and interposed between an interior partition 4 of the outside housing and the interior support of cutting element(s) 2 or tools 3, 5.

Below is described a possible, non-limiting example of layout of the upper level of the support of cutting elements (2), which has been the subject of a separate patent application submitted on the same day by the applicant.

Figure 3A:
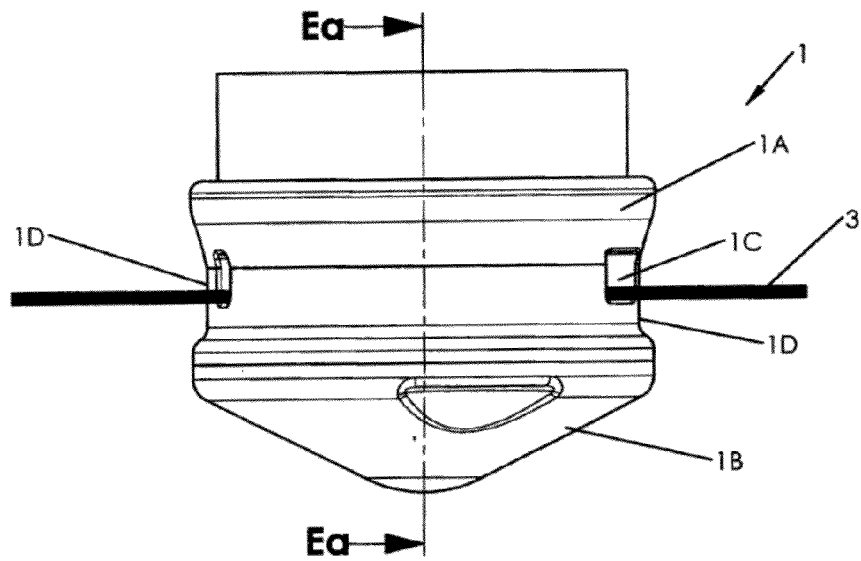
FIG. 3Aa is a front view of the cutting head provided with lengths of cutting wire, in unlocked position.
Figure 3A:
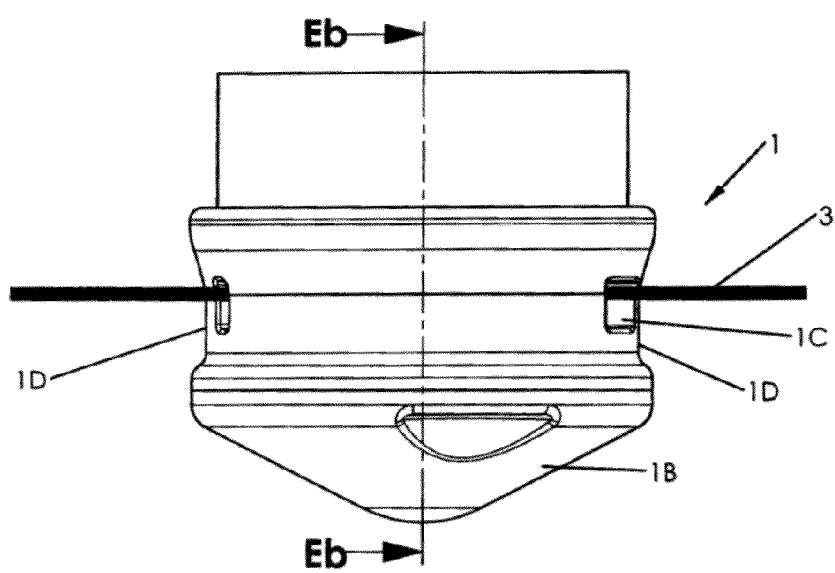
Figure 3B:
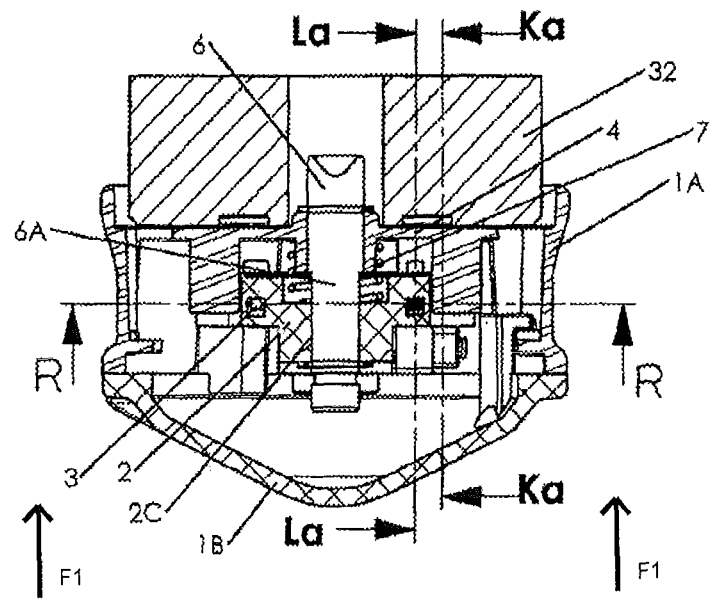
FIG. 3Ba is a cross-section along line Ea-Ea of FIG. 3Aa.
Figure 3B:
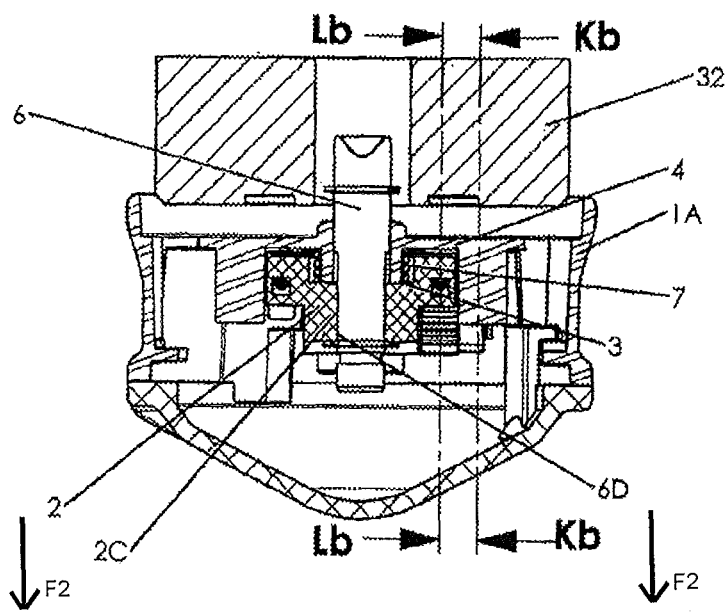
Figure 3C:
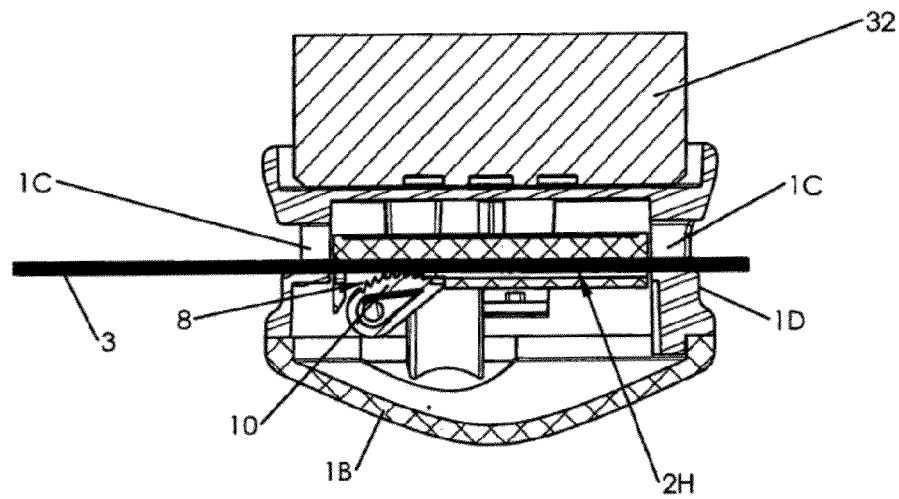
FIG. 3Ca is a cross-section along line La-La of FIG. 3Ba.
Figure 3C:
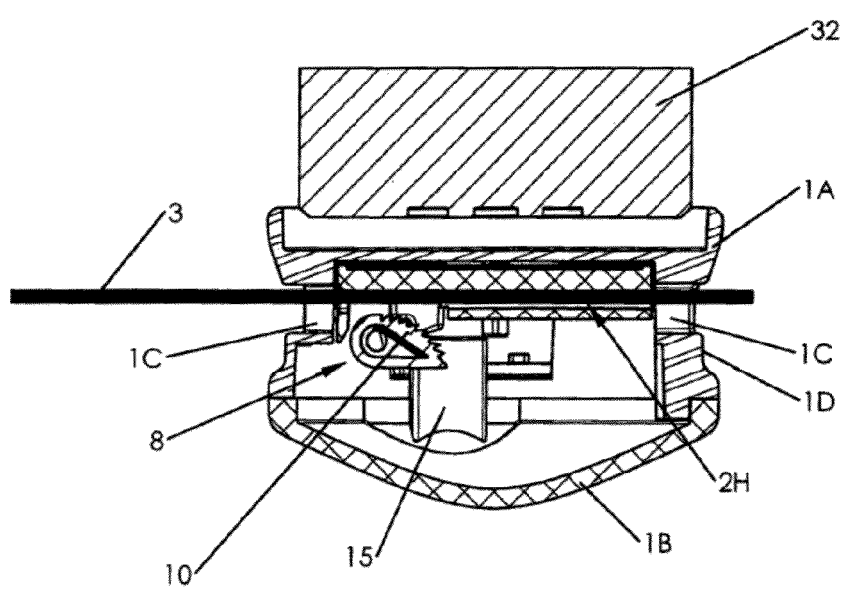
Figure 3D:
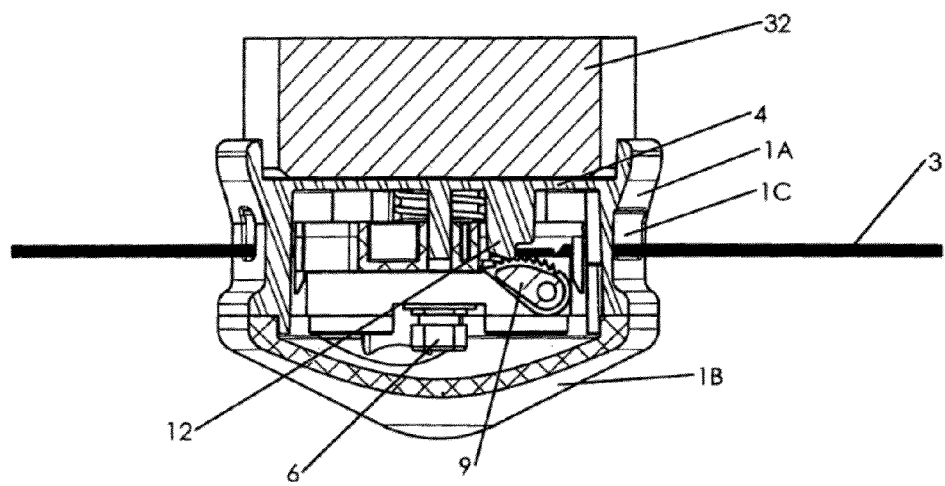
FIG. 3Da is a cross-section along line Ka-Ka of FIG. 3Ba.
Figure 3D:
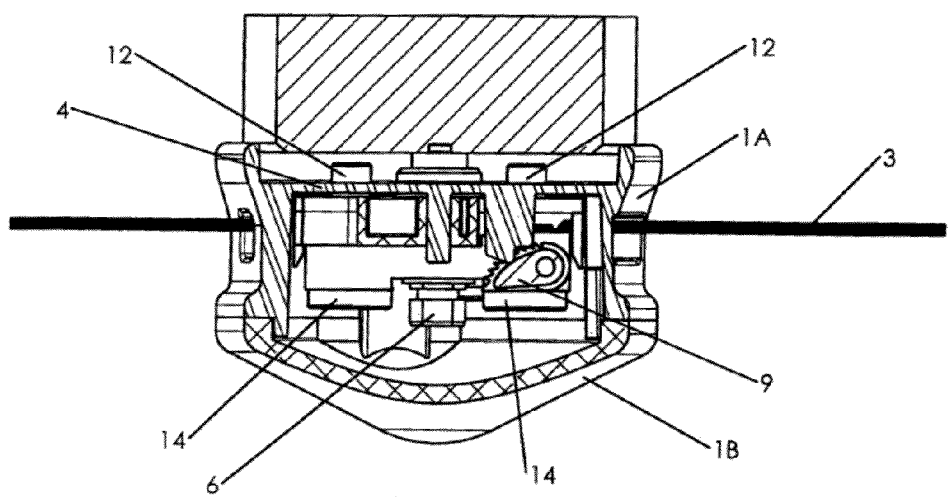
Figure 3E:
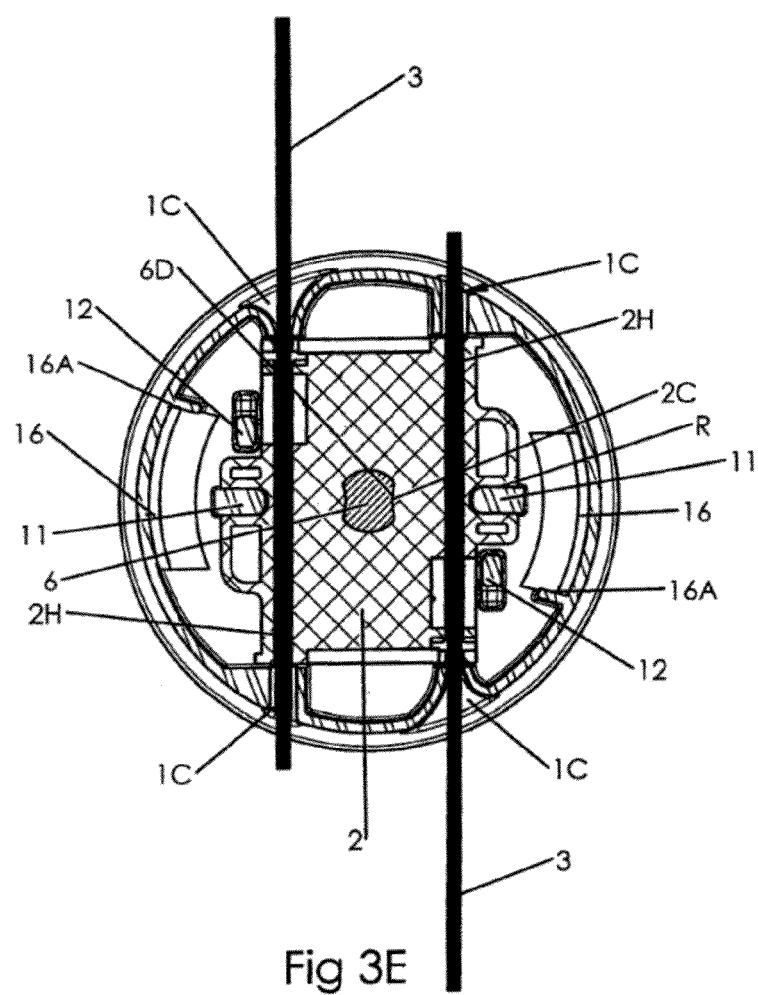
FIG. 3E is a bottom view and cross-section along line R-R of FIG. 3Ba unlocked position).
Figure 4A:
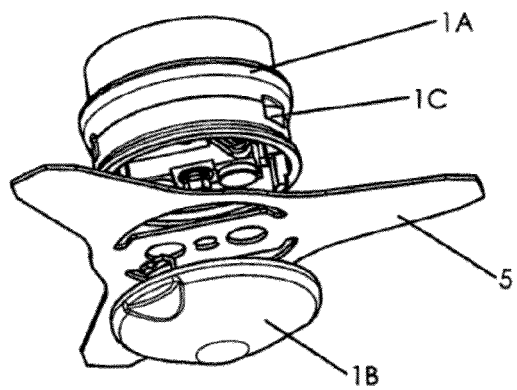
FIG. 4A is a perspective view showing the first phase of positioning, manually, a metal blade on or against the lower face of the upper part of the exterior housing.
Figure 4B:
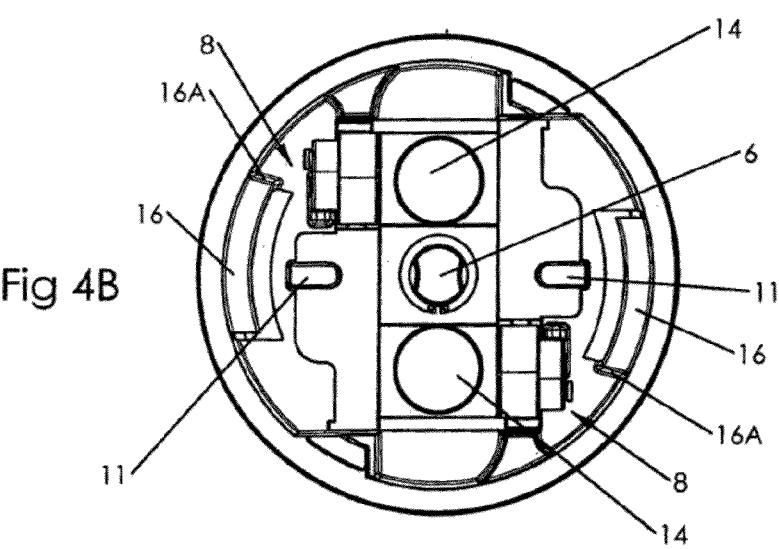
FIG. 4B is a bottom view of FIG. 4A, after retraction of the cutting blade and the sliding bowl.
Figure 4C:
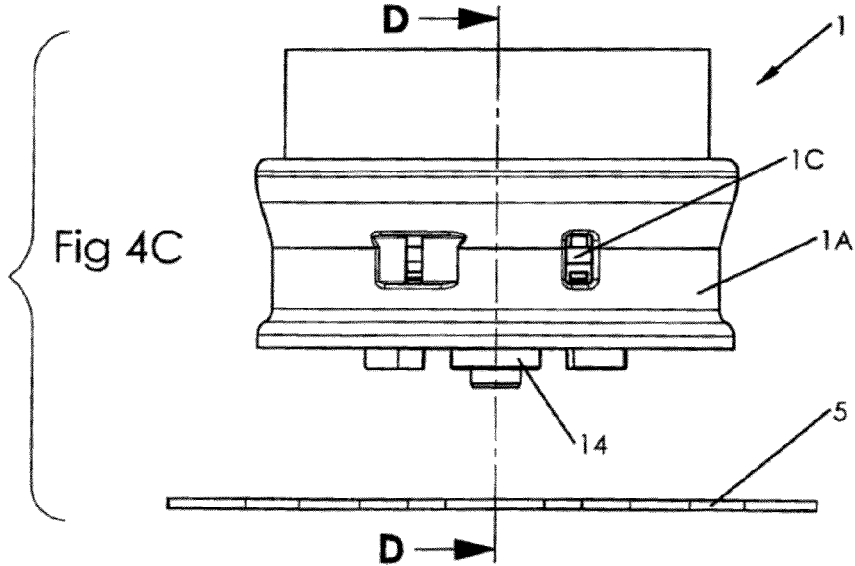
FIG. 4C is an exterior exploded view of FIG. 4A without the sliding bowl.
Figure 5A:
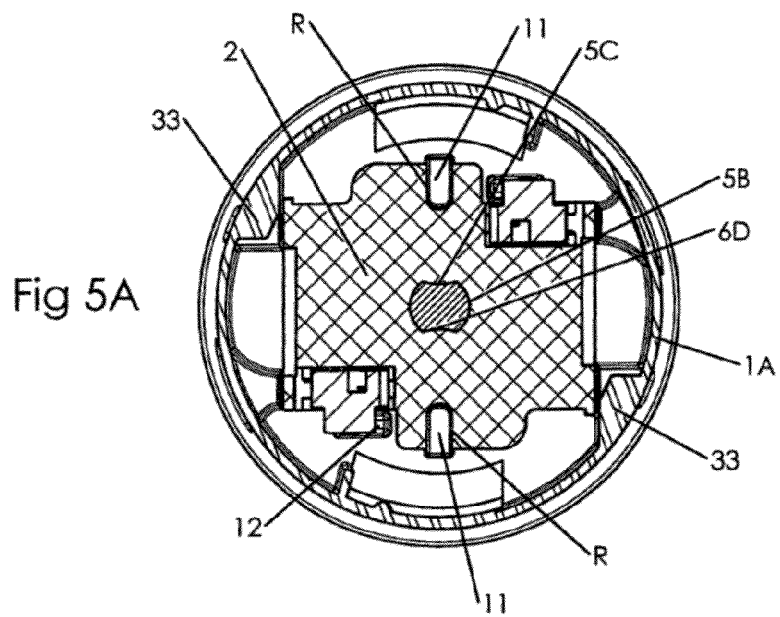
FIG. 5A is a bottom view and cross-section along line E-E of FIG. 5B.
Figure 5B:
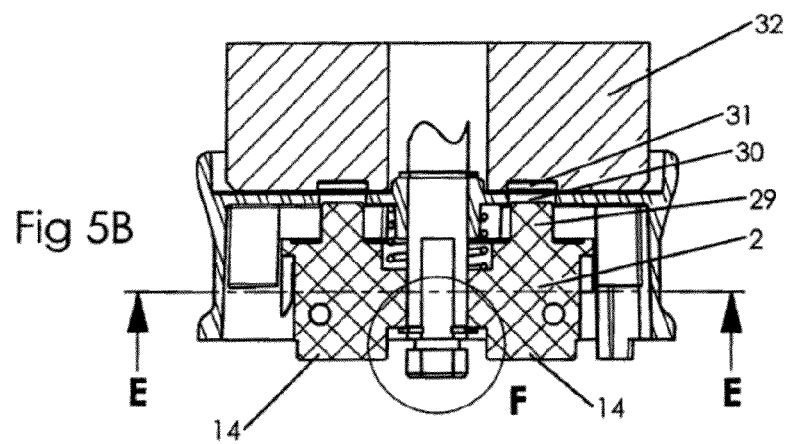
FIG. 5B is a cross-section along line D-D of FIG. 4C.
Figure 5C:
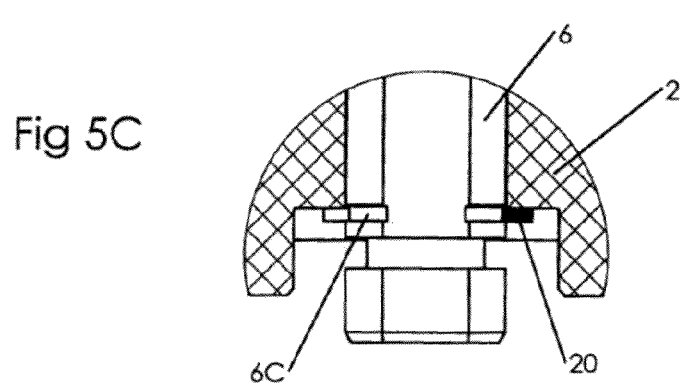
FIG. 5C is a detail view according to reference mark F of FIG. 5B.
Figure 7A:
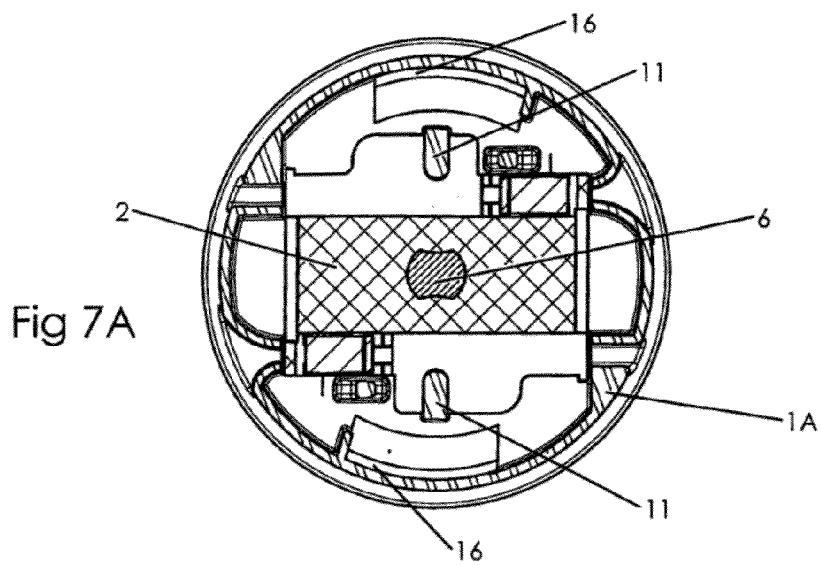
FIG. 7A is a cross-section along line EE of FIG. 6C.
Figure 7B:
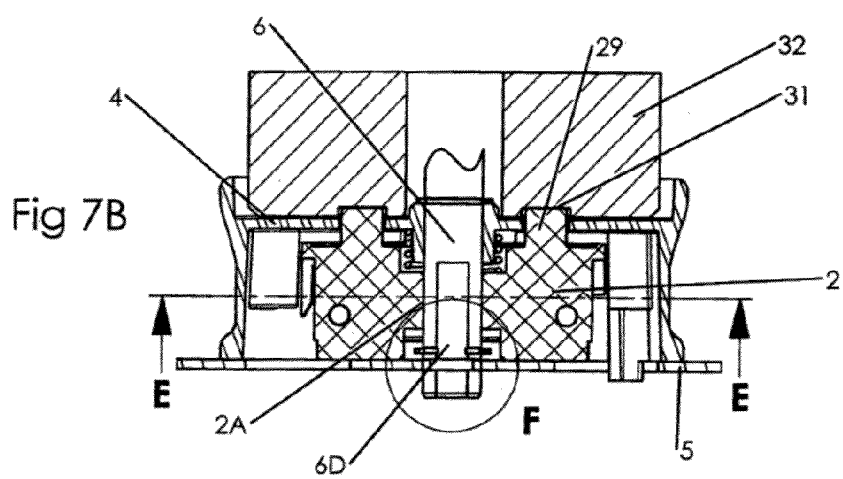
FIG. 7B is a cross-section along line D-D of FIG. 6C.
Figure 7C:
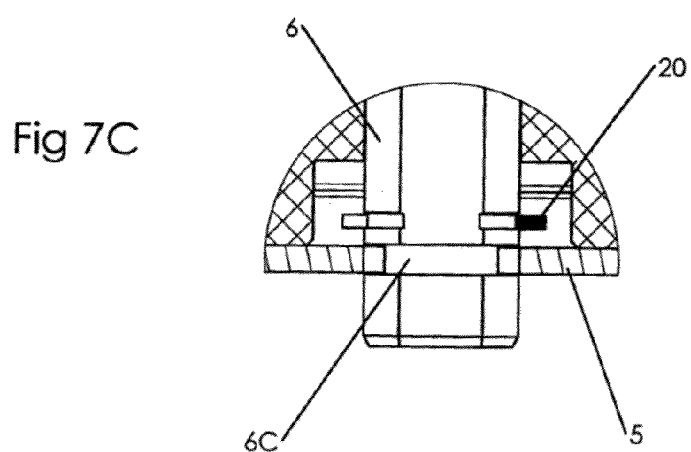
FIG. 7C is a detail view according to reference mark F of FIG. 7B.
Figure 9A:
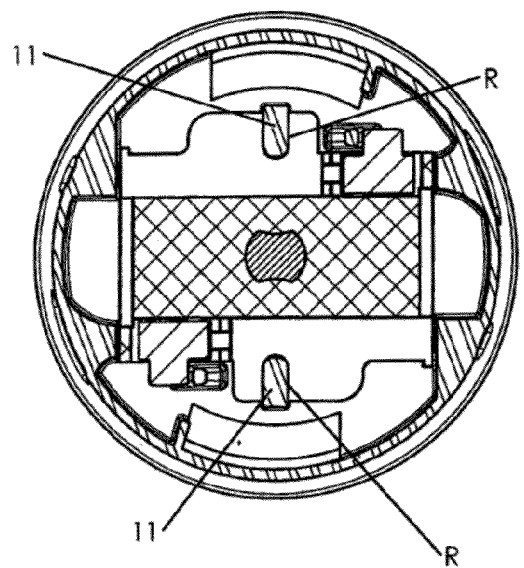
FIG. 9A is a cross-section along line E-E of FIG. 9B.
Figure 9B:
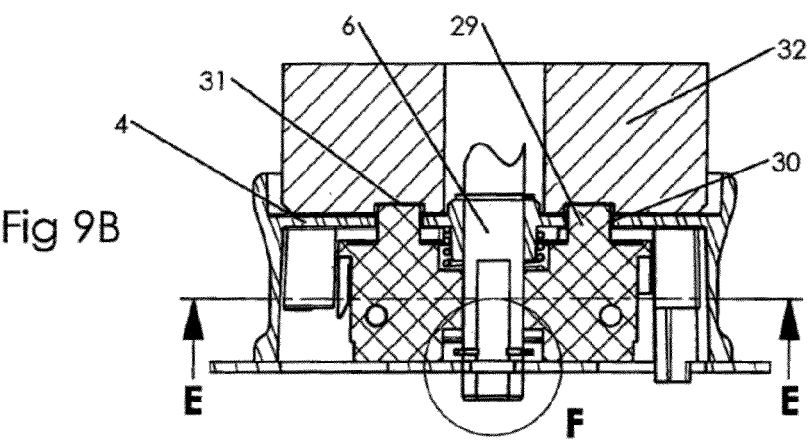
FIG. 9B is a cross-section along line D-D of FIG. 8C.
Figure 9C:
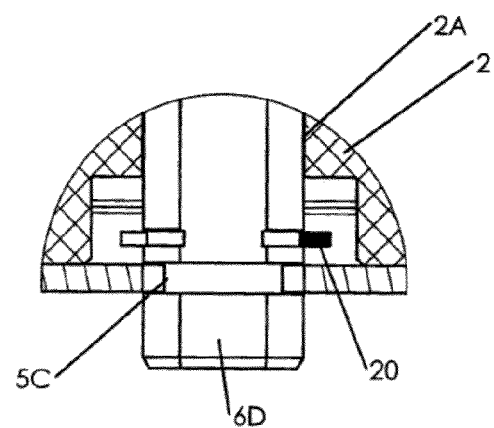
FIG. 9C is a detail view according to reference mark F of FIG. 9B.
Figure 10A:
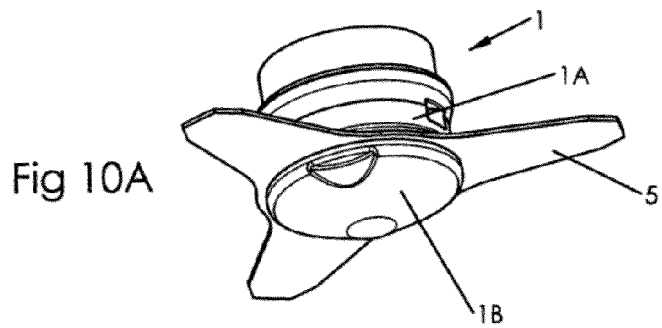
FIG. 10A is a perspective view showing the fourth phase of the positioning of the metal blade, in locked position.
Figure 10B:
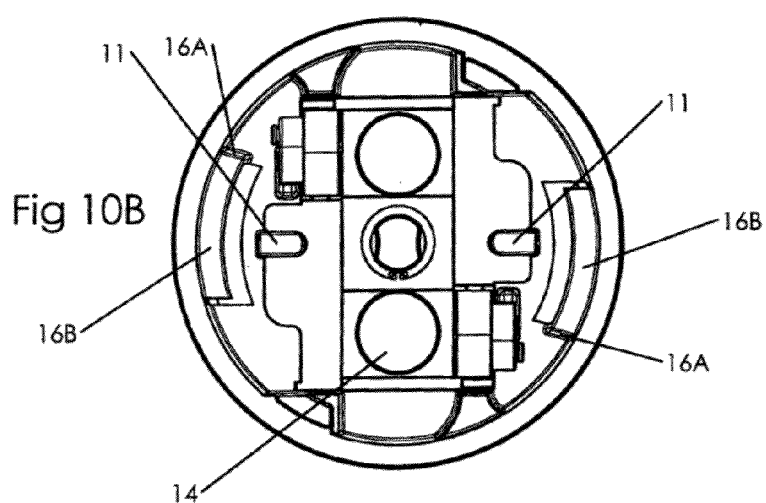
FIG. 10B is a bottom view of FIG 10A.
Figure 10C:
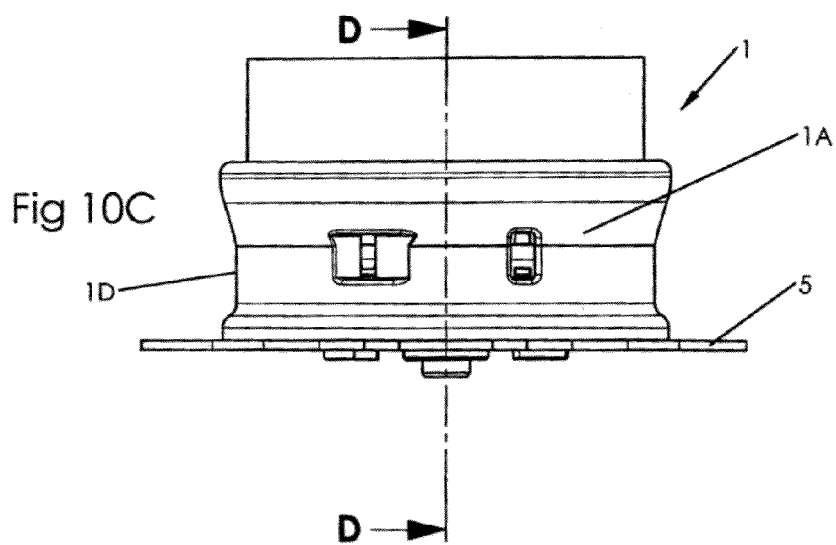
FIG. 10C is an exterior view of FIG. 10A without the sliding bowl.
Figure 11A:
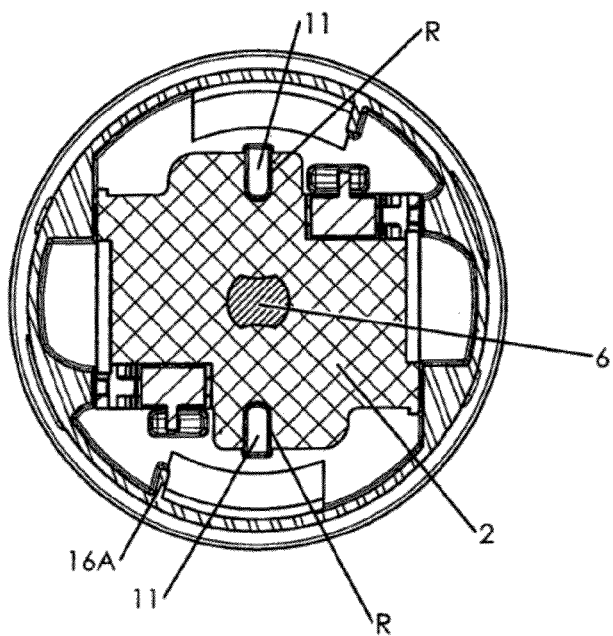
FIG. 11A is a cross-section along line E-E of FIG. 11B.
Figure 11B:
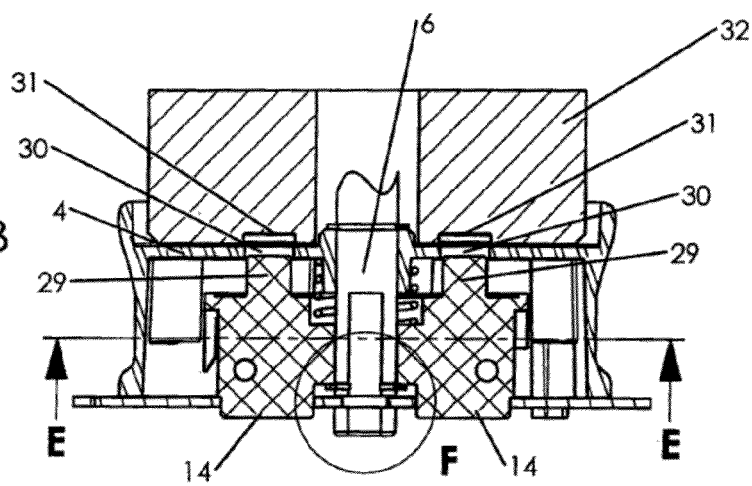
FIG. 11B is a cross-section along line D-D of FIG. 10C.
Figure 11C:
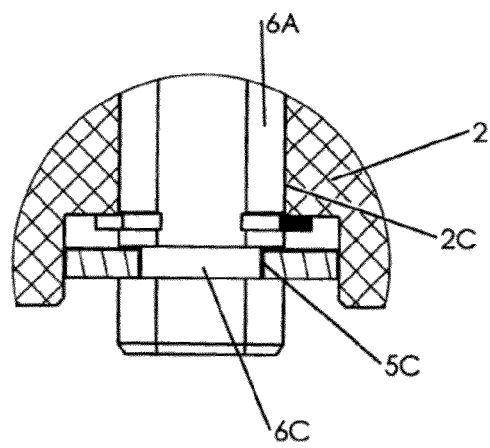
FIG. 11C is a detail view according to reference mark F of FIG. 11B.
Figure 12A:
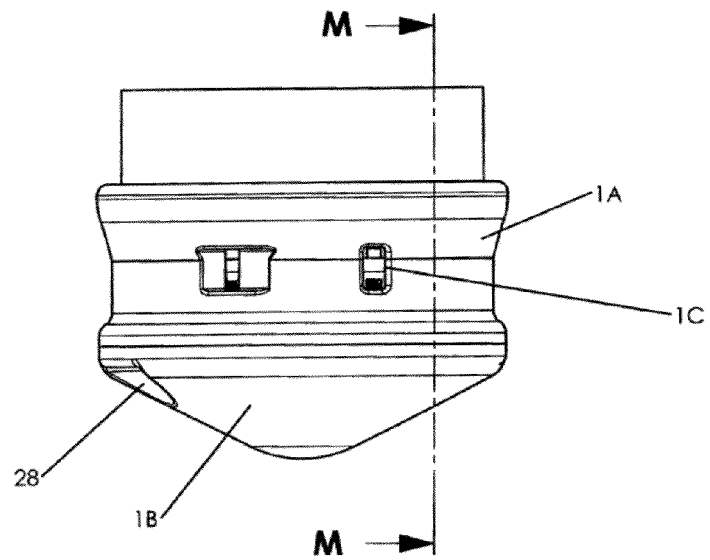
FIG. 12A is a front view showing a cutting head equipped with lengths of wire in locked position with the sliding bowl in unlocked position.
Figure 12B:
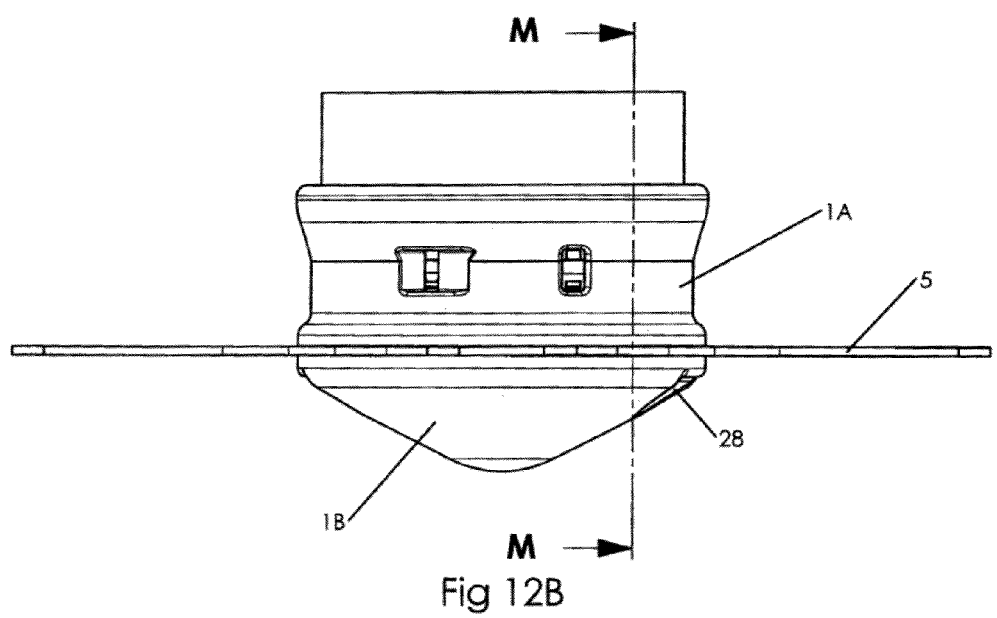
FIG. 12B is a front view showing a cutting head equipped with a metal blade in locked position.
Figure 13A:
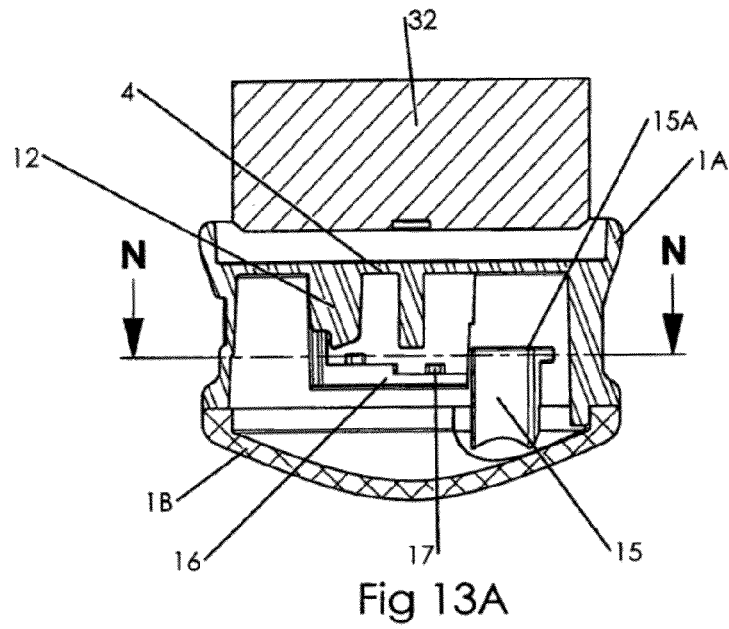
FIG. 13A is a cross-section along line M-M of FIG. 12A with the sliding bowl in unlocked position.
Figure 13B:
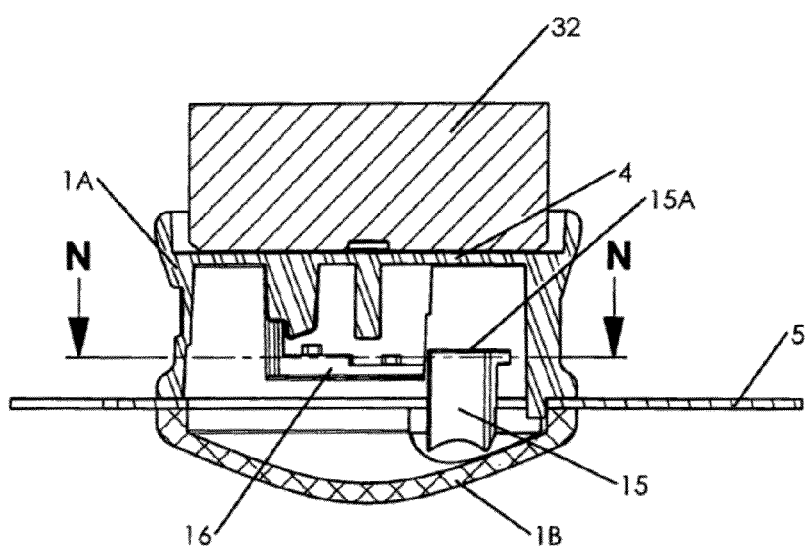
FIG. 13B is a cross-section along line M-M of FIG. 12B with the sliding bowl in locked position.
Figure 14A:
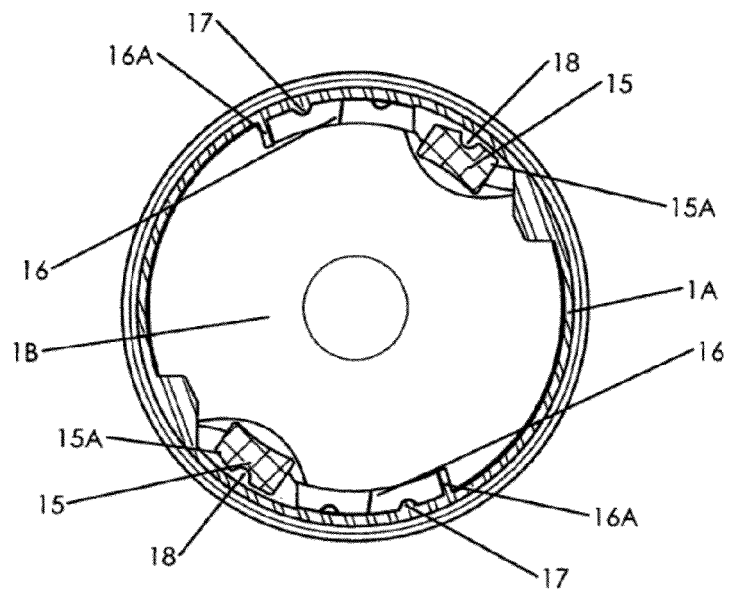
FIG. 14A is a cross-section along line N-N of FIG. 13A.
Figure 14B:
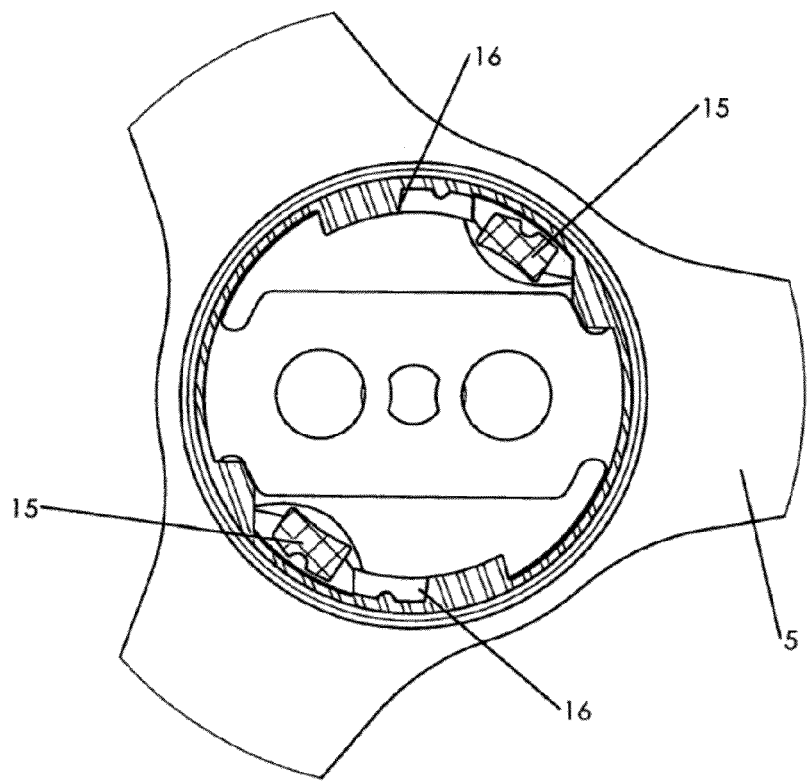
FIG. 14B is a cross-section along line N-N of FIG. 13B.
Figure 15A:
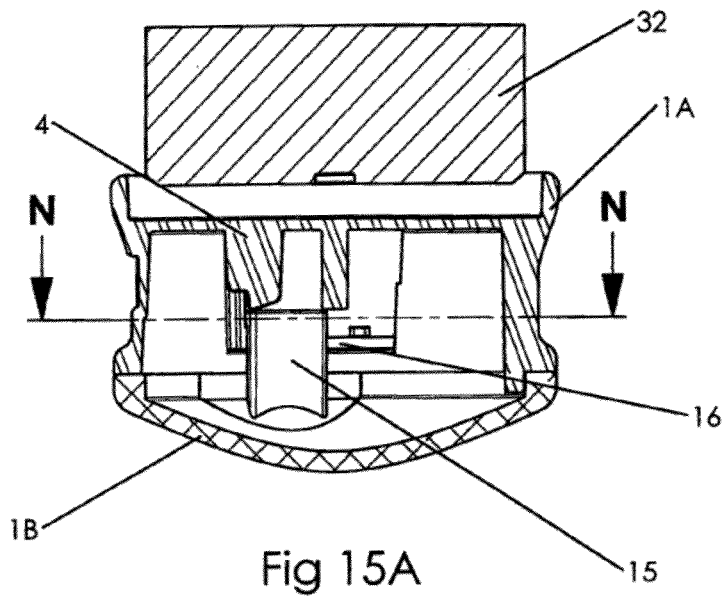
FIG. 15A is a cross-section along line M-M of FIG. 12A with the sliding bowl in unlocked position.
Figure 15B:
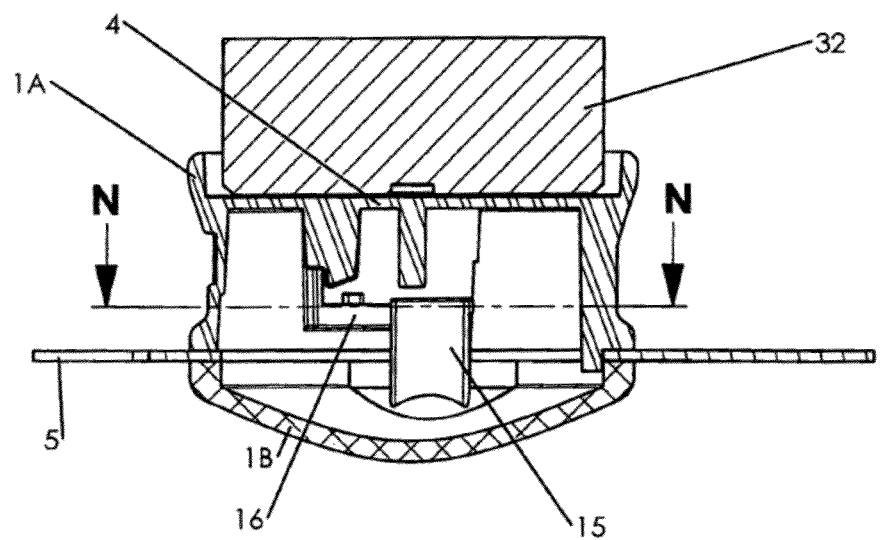
FIG. 15B is a cross-section along line M-M of FIG. 12B with the sliding bowl in looked position.
Figure 16A:
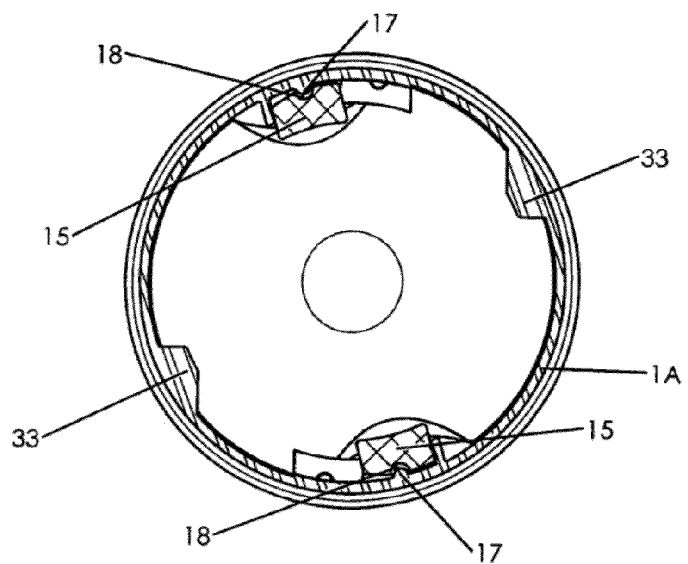
FIG. 16A is a cross-section along line N-N of FIG. 15A.
Figure 16B:
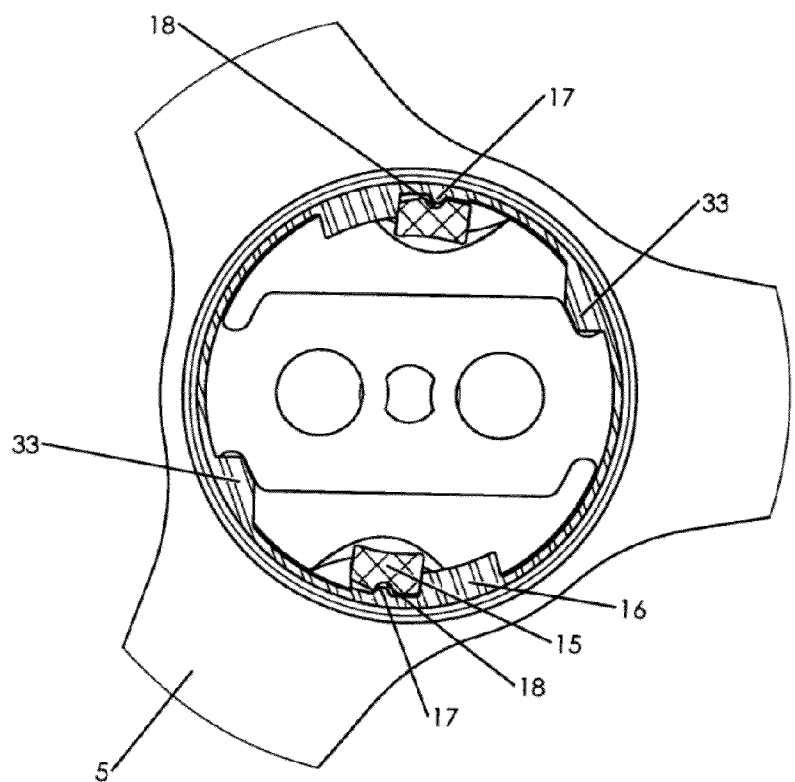
FIG. 16B is a cross-section along line N-N of FIG. 15B.

The upper level of the support of cutting element(s) or tools comprises a fastening mechanism for the lengths of cutting wire engaged inside the exterior housing 1A of the cutting head, through orifices 1C made in its sidewall 1D, integral in rotation of said fastening mechanism features clamping cams mounted with an aptitude for swiveling in the parallel planes between them and to the axis of rotation of the cutting head, this support of cutting elements or tools is mounted with an aptitude of axial translation of limited amplitude in the exterior housing of the cutting head, the latter 1A and the support 2 of the fastening mechanism being fitted in a complementary fashion, so that the simultaneous application of axial movements (Arrows F1, FIG. 3Ba) convergent to said housing and to said support is used to allow raising the clamping cams so as to permit the introduction, the sliding or the positioning of the cutting wires 3 inside the cutting head, whereas the simultaneous application of axial movements (Arrow F2, FIG. 3Bb) divergent to said housing and said support permits lowering said cams in order to achieve the blockage in active position of the cutting wires in the cutting head.

The fastening mechanism comprises two guiding and positioning channels 2H of the lengths of cutting wire 3, located in parallel on both sides of the rotational axis 6 of the cutting head facing the openings 1C of the exterior housing, an entrance portion of each of these channels is uncovered and a pivoting cam 9 is raised opposite this uncovered portion, this cam being subject to the action of a spring 10 tending to apply its clamping surface in the direction of said uncovered portion, so as to strongly press the cutting wire engaged in the positioning channel against the bottom of the latter, thereby ensuring the blockage of said cutting wire. The housing is equipped on the inside with thrust fingers 12 integral with an upper partitioning 4 of said housing and allowing to push back and pivot the cam in order to remove the pressure of the cam from the cutting wire 3 when the exterior housing and the support of the fastening mechanism are subjected to forces of convergent pressure tending to bring closer together the upper partitioning 4 of said exterior housing and the upper face of the support of the fastening mechanism.

Below is described a possible, non-limiting example of layout of the lower level of the cutting head permitting the mounting of an interchangeable cutting blade 5, this layout having been the subject of separate Patent application submitted on the same day by the applicant.

According to this embodiment, the cutting blade 5 is inserted between the upper part 1A and the lower part 1B of the housing.

More precisely:
the lower level of the support of cutting elements or tool 5 is constituted by a blade support 2, this blade support and the cutting blade 5 being provided with complementary means of positioning and coupling in rotation latter, these means being able to be disconnected, from their active position through the simultaneous manual application to said housing and to said blade support, of convergent relative axial movements;

the central part of the blade features:
on the one hand, a central opening 5B for the passage of the drive shaft 6, two coupling orifices 5F located on either side of the central opening, two openings 13 presenting a curved outer edge 13A and
on the other hand, solid portions 5E enabling the driving in of the blade on the distal part of the rotation shaft, up to its locking position.

The blade support and the central part of the blade 5 are fitted so as to allow the installation of said blade on said blade support 2 through a convergent relative axial movement of the latter, followed by a rotational movement of the blade; the removal of the blade is done by reverse movements.

The means for positioning and coupling of the cutting blade to the blade support comprise, on the one hand, two coupling studs 14 placed on the underside of said blade support, on both sides of the lower opening of the axial passage 24 made in the latter, and on the other hand, two orifices 5F on either side of the axial opening 5B of the blade in which the distal portion 6A of the drive shaft 6 is engaged.

According to another preferred embodiment, the rotational coupling of the interior blade support 2 and of the exterior housing 1A is achieved by means of drive pins 11 integral with the internal face of an upper partition 4 of the housing and oriented parallel to the rotational axis of the cutting head, towards the interior of the latter, these drive pins 11 being engaged with an aptitude for sliding in the grooves R made in the blade support.

The coupling grooves R are made in at least two opposite sides of the blade support.

According to another disposition, the drive shaft 6 traverses an axial passage 24 made in the blade support 2, and the traversing portion of the shaft and said axial passage present a complementary profile 2C, 6D adapted to allow the rotational drive of said support 2.

According to a preferred embodiment, said cutting head features means to limit the amplitude of axial translation of the blade support 5 on the traversing portion of the drive shaft 6. These means comprise, for example, two circlips 17 engaged in annular grooves 6C provided on the drive shaft 6. The cutting head includes means for blocking the blade support on the drive shaft.

According to a preferred embodiment, the means which allow the axial locking of the cutting blade 5 on the drive shaft 6 include, on the one hand, an axial opening 5B on the cutting blade and, on the other hand, an annular groove 6C on the distal portion 6A of the drive shaft, at the distance of its end, the end portion of said drive shall presenting from said groove on, a circular shape with two female, diametrically opposed longitudinal grooves 6D, whereas the axial opening 5D of the cutting blade presents a male shape 5C identical to that of the profile of said end portion.

According to another disposition, the lower edge 21 of the upper part 1A of the housing and the cutting blade 5 are provided with complementary positioning means 13-33.

The complementary means of positioning of the housing 1 and of the cutting blade 5 include, on the one hand, two openings delineated by an external arched edge 13A and located on either side and at equal distance of the diametrical alignment of openings 5F on the blade 5, and, on the other hand, diametrically opposed guide and stop cleats 33 provided at the base of the upper part 4 of the housing.

According to another characteristic disposition of the invention, the part of the lateral wall 1D of the housing and the upper circular part of the sliding bowl are provided with complementary restraining fixtures 15, 16, the assembly of which requires only a relative axial movement of the two parts, followed by a rotational movement of limited amplitude, allowing the engagement of the complementary elements of said retaining fixtures.

According to another disposition, the restraining fixtures of housing 1A and of the bowl 1B comprise, on the one hand, in the vicinity of and along the circular lower edge of the internal surface of the cylindrical sidewall 1D of the housing, at least two diametrically opposed rounded shoulders 16, and, on the other hand, at least two diametrically opposed lock stops 15 extending parallel to the axis of the sliding bowl and the free end of which is provided with a locking peg or lug 15A oriented in direction of this axis.

Preferably, the cutting head includes a stop 16A located at one of the ends of each shoulder 16, limiting the rotational movement of the locking pegs or lugs 15A during the placement of the sliding bowl in the engagement position.

According to another advantageous disposition, the edge of the peg 15 and the rounded shoulder of the pegs 16 are provided with complementary locking means at the end of the rotational movement when the housing parts are engaged.

According to a preferred embodiment, the complementary locking means of the lower part on the upper part of the housing are constituted by a stud 17 on the upper face of the shoulders 16 and by a notch 18 provided in the outside edge 15A of the peg in which said locking stud engages automatically at the end of the rotational movement of engagement.

The mounting and removal of an interchangeable mobile blade 5 on a cutting head is easily understood after the preceding disclosure, while considering the mounting of a cutting blade on a cutting head:
the sliding bowl 1B is removed by a rotational movement, in order to disconnect the shoulders 16 and the locking tabs 15; the external hemispherical face featuring two diametrically opposed indentations 28 facilitate this manipulation;
the blade 5 is placed on the end of the drive shaft 3 (only one position is possible because of the complementary profile of said end and of the axial opening 5B of the blade 5) in this position the cutting blade rests on the studs 14 of the blade support 2;
a movement of convergent approach is imparted on the blade support 5 and the exterior housing 1, by exerting moderate manual pressure on the cutting blade 5 which rests on the drive studs 14 of the blade support, until said blade 5 reaches the level of the groove 6C; one observes that the drive studs 14 of the blade support 2 find themselves pushed against the full sections SE of the blade and distant at 90° from the coupling orifices 5F. In practice this convergent approach movement achieved by pushing on the blade 5, has the effect of displacing the blade support 2, against the opposing action of spring 7.
a rotational movement in the order of 90° is imparted on the blade. During this action the blade is guided by arched openings 13 in which slide the centering stop cleats 33, integral with the base of the exterior housing 1A. At the end of this rotational movement:
on the one hand, the male elements or lobes protruding in the axial opening 5B of the cutting blade 5 find themselves engaged between the walls of the annular groove 6C of the drive shaft 6, whereas on the other hand, the coupling studs 14 penetrate automatically, under the action of the spring 7, into the coupling orifices 5F, the blade support 2 moves axially along the drive shaft 6 under the action of the compression spring 7 until it hits against the retaining circlip 20 of said drive shaft.

To facilitate maintaining the blade support 2 in a fixed position during this rotation of the blade 5, said blade support 2 is equipped on its upper surface, with two tenons 29 which, during the upward movement of said blade support engage in two holes 30 in the upper partitioning 4 of the exterior housing to engage in the orifices 31 made in the fixed support 32 of the cutting head 1 serving as housing for motor 37, whereby rotation of said blade support 2 during this operation is avoided.

The sliding bowl 1B is put back in place by an axial movement, followed by a rotation of said sliding bowl 1B in relation to the exterior housing 1.

To perform retraction of the blade 5:

the sliding bowl 1B must be removed, then one must push on the coupling studs 14 of the blade support 2 in order to withdraw the from the orifices 5F of the blade and perform rotation of said blade of about 90°.

The drive studs find themselves again under the cutting blade 5 and the lobes 5A opposite the complementary profile of the drive shaft 6 which allows the cutting blade 5 to move in direction of the distal part of the drive shaft 6 until it disengages from said drive shaft under the action of the blade support 2 on which acts the compression spring 7.

The invention concerns also portable cutting devices such as grass-cutters, edge-trimmers, shrub slashers, hedge-trimmers, equipped or likely to be equipped with a cutting head featuring the previously described characteristics.

Figure 17:
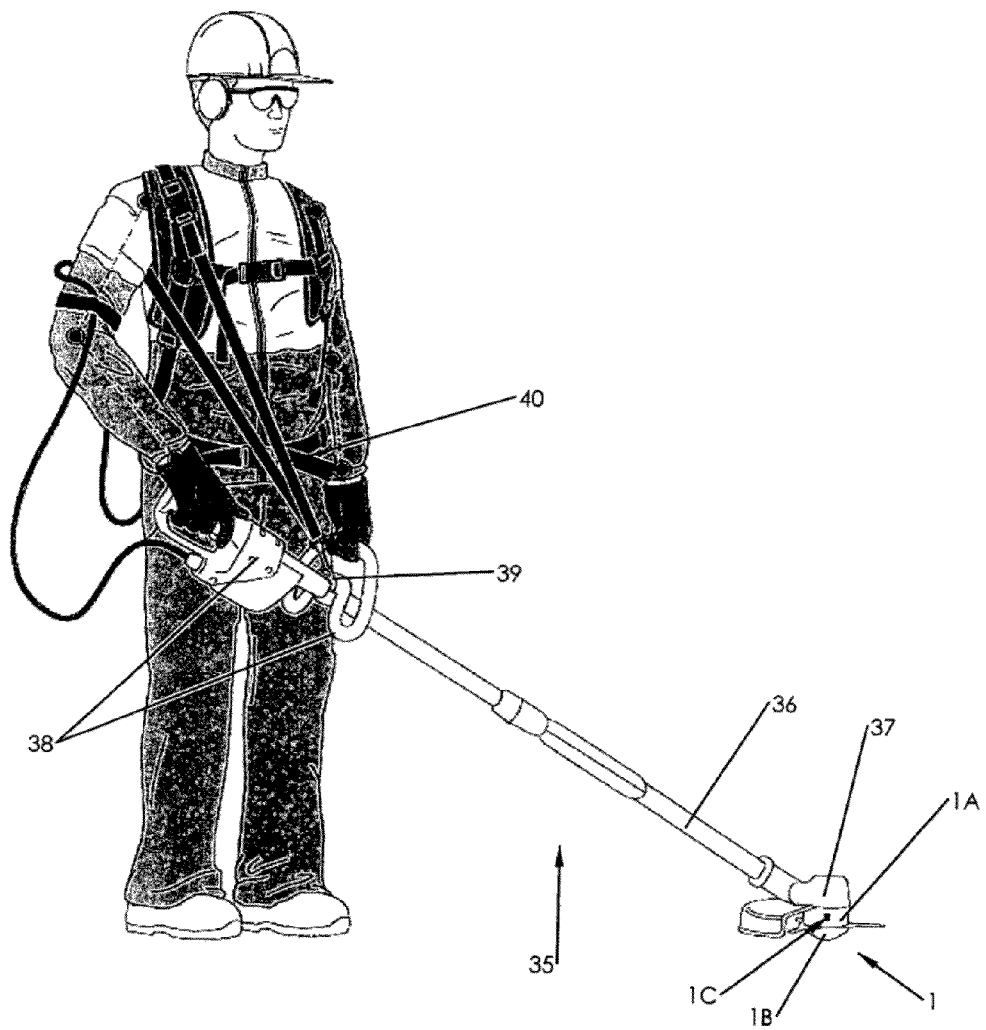
FIG. 17 is a perspective view of a grass-cutter equipped with a cutting head using a metal blade according to the invention.

Such devices, an example of which is shown in its entirety by reference 35 in FIG. 17, generally feature: a handle 36 supporting at its distal end the cutting head 1 (1A, 1B, 1C), a motorization 37 installed at the lower part or at the upper part of the handle for the rotational drive of the cutting head, a U-grip or a guiding double grip 38 for control of this motorization, a ring 39 for the attachment of a carrying harness 40. The drive motorization of the cutting head may be powered by a thermal engine, an electrical motor driven by a portable battery or by connection to the net.

I claim:

1. A multifunctional rotary cutting head for use with a cutting device, the multifunctional rotary cutting head comprising:

a rotational housing having an upper part and a lower part, said lower part mounted at a base of said upper part;

a support for a cutting element housed in said rotational housing, said support traversed by an axial drive shaft integral in rotation, said axial drive shaft having an upper portion that is adapted to be coupled to a motor of the cutting device, said support mounted so as to be axially movable on said drive shaft, said support having two levels for selective mounting, said two levels having a first level adapted for mounting of lengths of cutting wire and a second level adapted to mount an interchangeable cutting blade; and a means for locking or disconnecting the cutting element such that a simultaneous application of relative axial movement in opposite directions to said housing and to said support causes either a placement of the level corresponding to a cutting element in a position that allows positioning or retraction of the cutting element or a blockage of the cutting element on the level of said support corresponding to the cutting element.

2. The multifunctional rotary cutting head of claim 1, said first level being an upper level, said second level being a lower level.

3. A multifunctional rotary cutting head for use with a cutting device, the multifunctional rotary cutting head comprising:

a rotational housing having an upper part and a lower part, said lower part mounted at a base of said upper part;

a support for a cutting element housed in said rotational housing, said support traversed by an axial drive shaft integral in rotation, said axial drive shaft having an upper portion that is adapted to be coupled to a motor of the cutting device, said support mounted so as to be axially movable on said drive shaft, said support having two levels for selective mounting, said two levels having a first level adapted for mounting of lengths of cutting wire and a second level adapted to mount an interchangeable cutting blade, said housing and said support being arranged such that simultaneous application of convergent axial movements to said housing and said support allows a placement of the level corresponding to the cutting element to a position allowing a position or retraction of the cutting element while a simultaneous application of divergent axial movements to said housing and said support causes an automatic locking of the cutting element at the level of the support corresponding to the cutting element.

4. The multifunctional rotary cutting head of claim 3, wherein relative convergent axial movements of said housing and said support are caused by an elastic return element such that the cutting element is automatically locked.

5. The multifunctional rotary cutting head of claim 4, said elastic element being a spring acting in compression, said spring interposed between an interior partition of said housing and said support.

6. The multifunctional rotary cutting head of claim 3, said first level having a fastening mechanism engaged within said housing through orifices formed in sidewalls of said housing, said fastening mechanism having clamping cams mounted so as to swivel in parallel planes relative to a rotational axis of the cutting head, wherein simultaneous application of convergent axial movement to said housing and said support raises said clamping cam so as to allow for the introduction and sliding of the length of cutting wire within the cutting head, wherein simultaneous application of divergent axial movement to said housing and said support lowers said clamping cams so as to lock the length of cutting wire.

7. The multifunctional rotary cutting head of claim 6, said fastening mechanism comprising a pair of channels adapted to guide and position the length of cutting wire, said pair of channels arranged in parallel on opposite sides of a rotational axis of the cutting head opposite to said orifices of said housing, said pair of channels having an entrance with a portion that is open and a pivoting cam mounted so as to face said portion of said entrance, said pivoting cam being driven by a spring so as to urge a clamping surface of said pivoting cam in a direction of said portion of said entrance so as to firmly push the length of cutting wire against a bottom of said channel, said housing having pushing fingers mounted internally thereof to said interior partition so as to push and swivel said pivoting cam so as to release pressure from the length of cutting wire when said housing and said support are subject to convergent pressure so as to urge said interior partition and an upper face of said support together.

8. The multifunctional rotary cutting head of claim 3, further comprising:
a cutting blade positioned between said upper part and said lower part of said housing, said second level of said support having a blade support thereon, said cutting blade and said blade support being positionally and rotationally coupled to said support so as to be disconnected from an active position by convergent axial movement manually applied to said housing and to said support;
a means for axially blocking of said cutting blade on a distal portion of said drive shaft; and
a means for automatically coupling of said blade support to said blade when said blade is positioned on said blade support.

9. The multifunctional rotary cutting head of claim 8, said cutting blade having a central portion, said central portion having a central opening through which said drive shaft passes, said central portion having a pair of coupling orifices positioned on opposite sides of said central opening, said portion having at least one solid part that allows said cutting blade to be placed on a distal portion of said drive shaft in a locking position.

10. The multifunctional rotary cutting head of claim 9, said blade support and said central portion of said cutting blade arranged so as to allow installation of said cutting blade on said blade support by a convergent axial movement of said blade support and a rotational movement of said cutting blade.

11. The multifunctional rotary cutting head of claim 9, said blade support having a pair of coupling studs positioned therebeneath.

12. The multifunctional rotary cutting head of claim 8, said interior partition of said housing having drive fingers affixed thereto that are oriented parallel to the rotational axis of the cutting head, said blade support having grooves formed therein, said drive fingers respectively engaged with said grooves.

13. The multifunctional rotary cutting head of claim 12, said grooves being formed on at least two sides of said blade support.

14. The multifunctional rotary cutting head of claim 8, said drive shaft traversing an axial passage formed in said blade support.

15. The multifunctional rotary cutting head of claim 8, further comprising:
a means for limiting axial translation of said blade support on a traversing portion of said drive shaft through said axial passage.

16. The multifunctional rotary cutting head of claim 8, further comprising:
a means for locking said blade support on said drive shaft.

17. The multifunctional rotary cutting head of claim 8, said means for axially blocking comprising:
an axial opening formed on said cutting blade; and
an annular groove on the distal portion of said drive shaft, an end portion of said drive shaft presenting a circular shape with a pair of diametrically opposed female longitudinal grooves, said axial opening of said cutting blade having a male shape identical to a profile of said end portion of said drive shaft.

18. The multifunctional rotary cutting head of claim 8, wherein a lower edge of said upper part of said housing and said cutting blade having a complementary means for positioning, said complementary means for positioning comprising a pair of openings delineated by an arched outside edge and placed on opposite sides and at equal distances from a diametrical alignment of openings on said cutting blade, said complementary means for positioning further comprising diameterically-opposed guidance and stop cleats provided on a base of said upper part of said housing.

19. The multifunctional rotary cutting head of claim 3, further comprising:
a sliding bowl having a circular upper portion, a lower part of a sidewall of said housing and said circular upper portion of said sliding bowl having complementary restraining fixtures such that an engagement requires only a single axial movement of said lower part and said circular upper portion followed by a rotational movement of limited amplitude so as to allow engagement of complementary elements of said restraining fixtures.

20. The multifunctional rotary cutting head of claim 19, said restraining fixtures comprising at least two dimeterically-opposed rounded shoulders adjacent to a lower circular edge of an internal surface of a cylindrical sidewall of said housing and at least two diametrically opposed lock stops extending parallel to an axis of said sliding bowl and a free end thereof having a locking peg oriented in a direction of said axis of said sliding bowl.

21. The multifunctional rotary cutting head of claim 20, one of said shoulders having a stop at an end thereof so as to limit a rotational movement of the locking peg when said sliding bowl is in an engagement position.

22. The multifunctional rotary cutting head of claim 21, said locking peg having an edge and the rounded shoulder having complementary locks at an end of the rotational movement thereof.

23. The multifunctional rotary cutting head of claim 22, said complementary locks comprising a locking stud affixed to an upper face of the shoulder and a notch provided in said edge of said pag, said locking stud engaging with said notch automatically at the end of the rotational movement.

24. A portable cutting device equipped with a rotary cutting head in accordance with claim 3.

* * * * *